No. 775,800. PATENTED NOV. 22, 1904.
W. R. CUNNINGHAM.
BRICK OR TILE CUTTING MACHINE.
APPLICATION FILED JUNE 4, 1904.
NO MODEL. 6 SHEETS—SHEET 4.
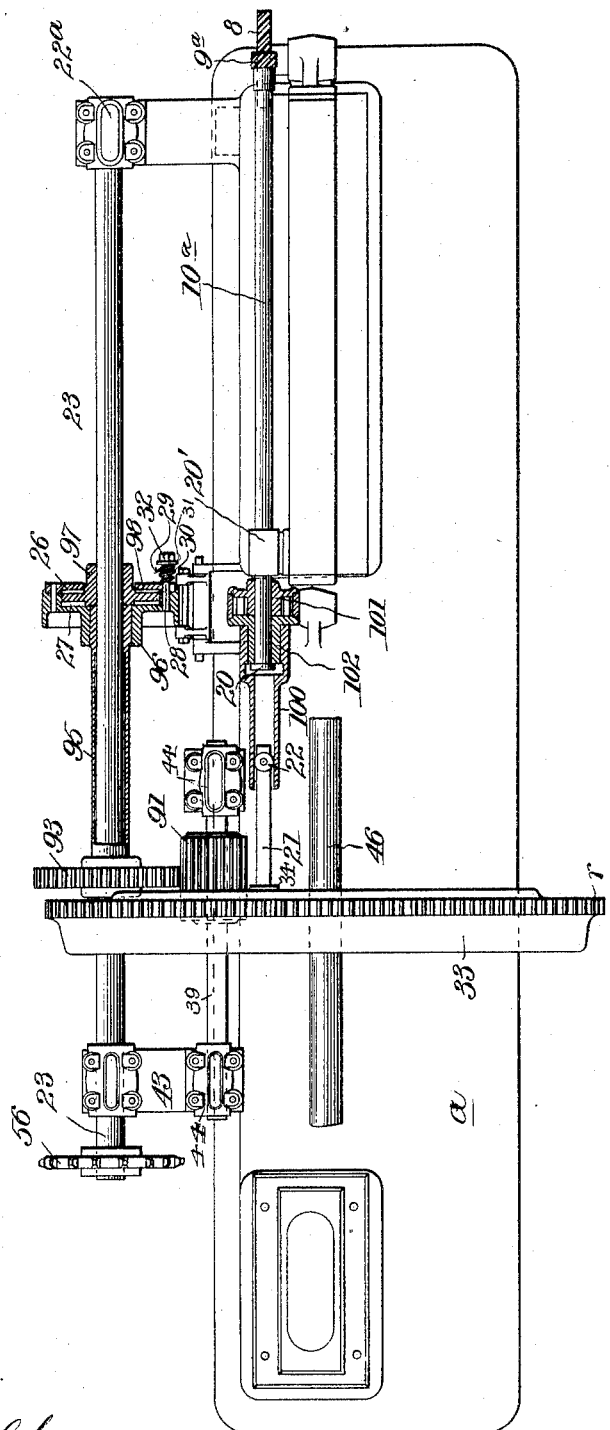
WITNESSES:
INVENTOR
William R. Cunningham
By
T. Walter Fowler
His Attorney No. 775,800. PATENTED NOV. 22, 1904.
W. R. CUNNINGHAM.
BRICK OR TILE CUTTING MACHINE.
APPLICATION FILED JUNE 4, 1904.
NO MODEL. 6 SHEETS—SHEET 5.

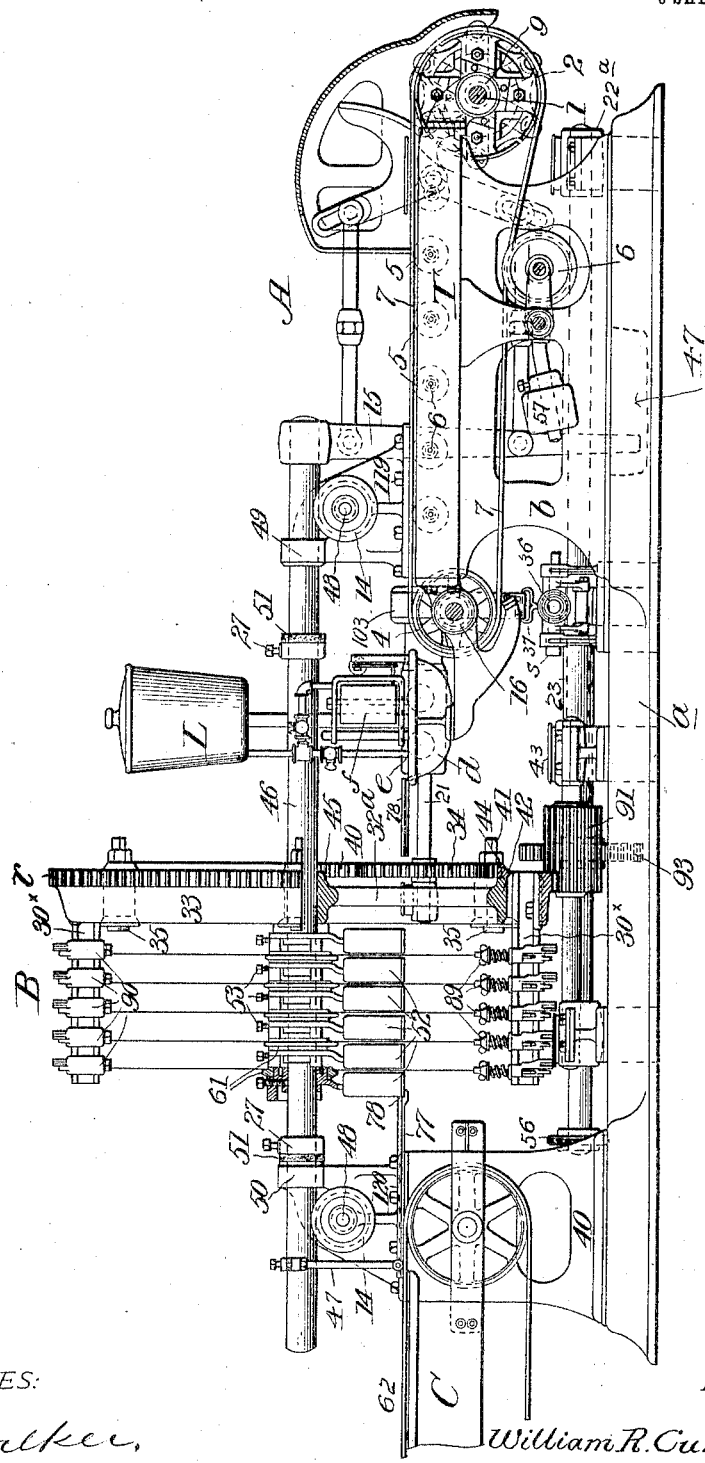

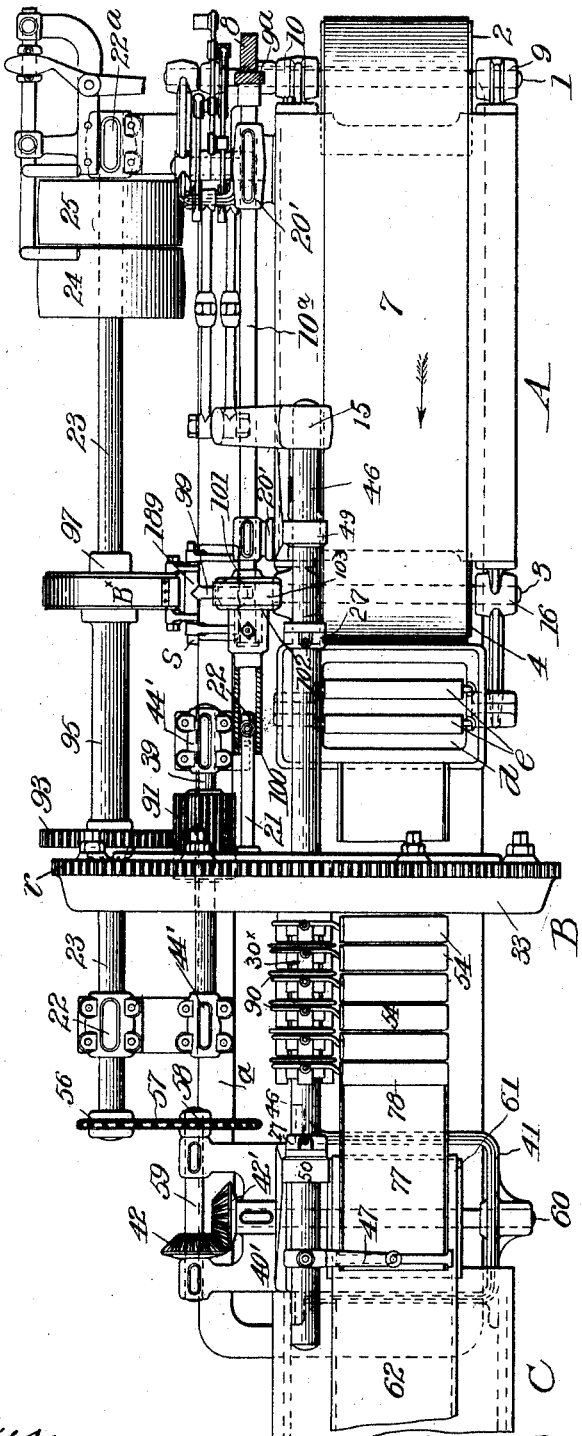

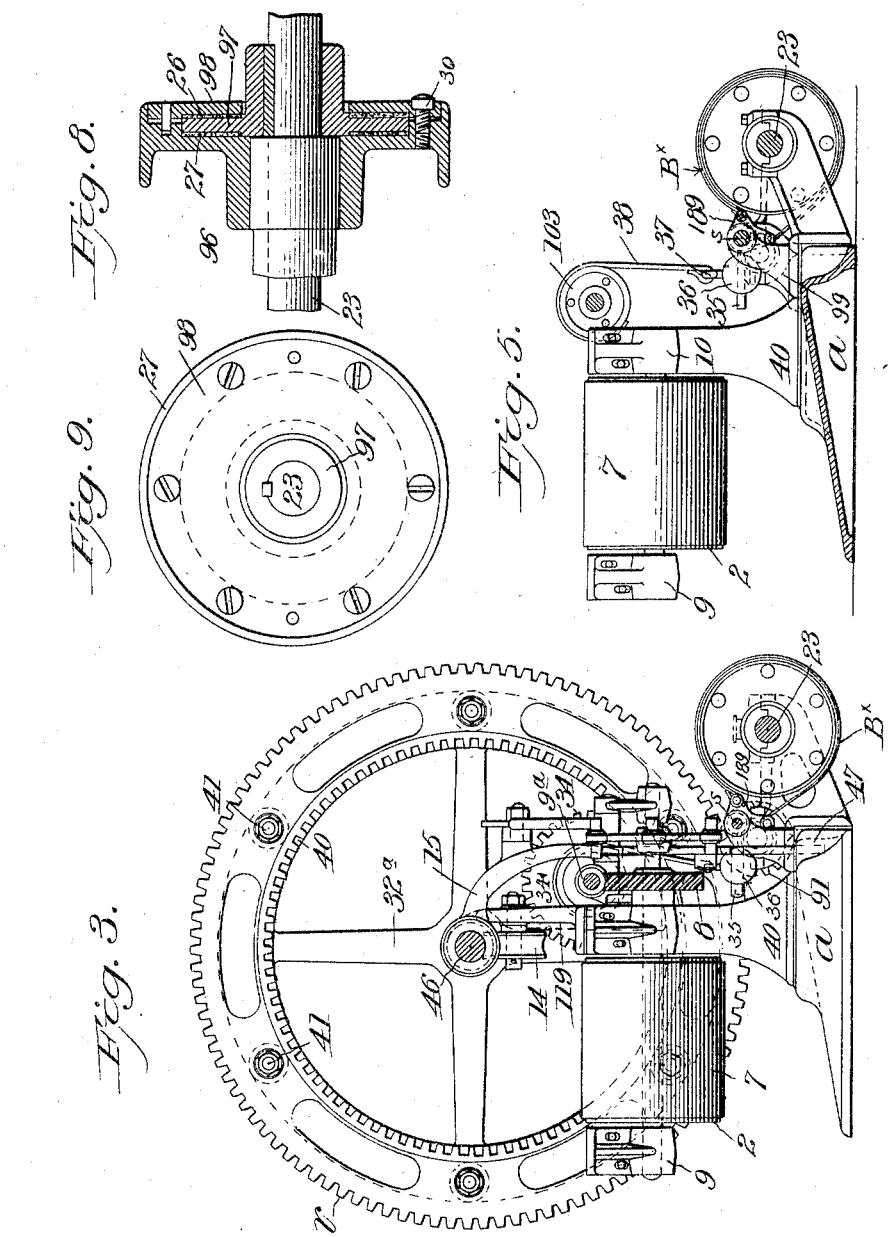

WITNESSES: INVENTOR
William R. Cunningham
BY
T. Walter Fowler
his Attorney

No. 775,800. PATENTED NOV. 22, 1904.
W. R. CUNNINGHAM.
BRICK OR TILE CUTTING MACHINE.
APPLICATION FILED JUNE 4, 1904.
NO MODEL. 6 SHEETS—SHEET 6.
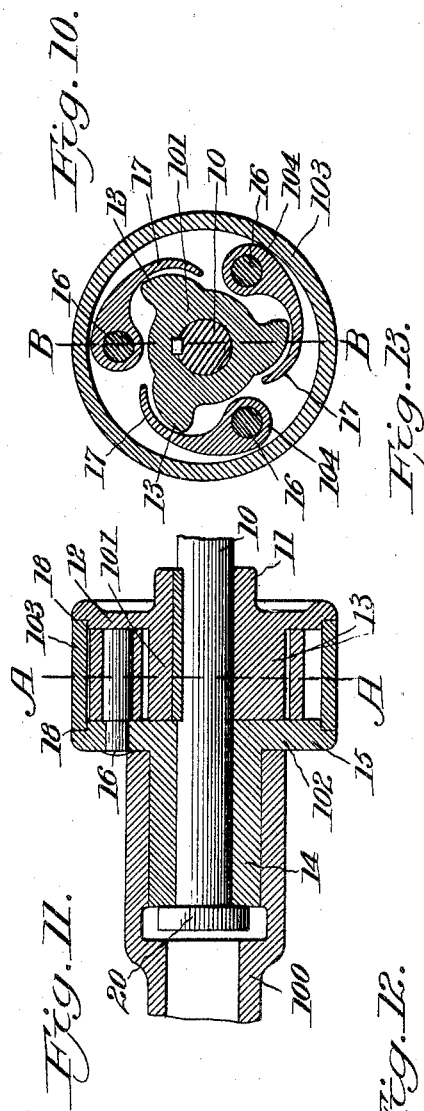
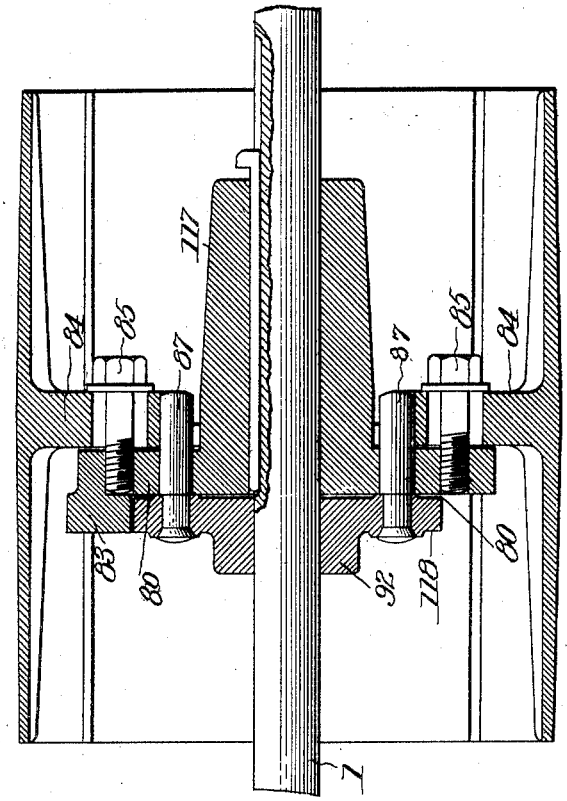
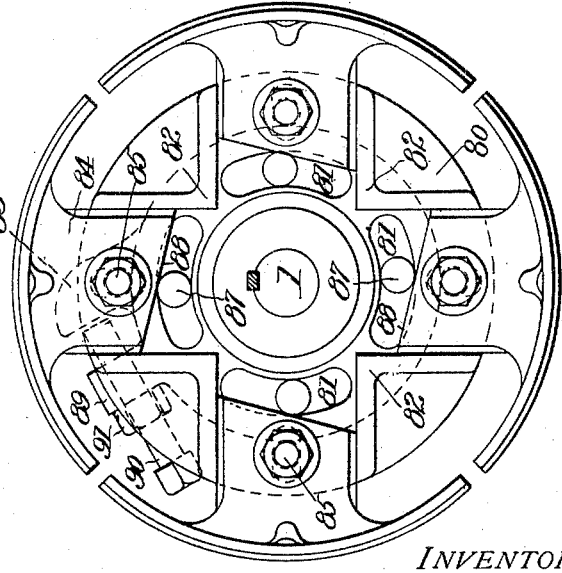
WITNESSES:
INVENTOR
William R. Cunningham.
BY
T. Walter Fowler
his Attorney No. 775,800. Patented November 22, 1904.

UNITED STATES PATENT OFFICE.

WILLIAM R. CUNNINGHAM, OF BUCYRUS, OHIO, ASSIGNOR TO THE AMERICAN CLAY WORKING MACHINERY COMPANY, OF BUCYRUS, OHIO, A CORPORATION OF OHIO.

BRICK OR TILE CUTTING MACHINE.

SPECIFICATION forming part of Letters Patent No. 775,800, dated November 22, 1904.

Application filed June 4, 1904. Serial No. 211,158. (No model.)

*To all whom it may concern:*

Be it known that I, WILLIAM R. CUNNINGHAM, a citizen of the United States, residing at Bucyrus, in the county of Crawford and State of Ohio, have invented new and useful Improvements in Brick or Tile Cutting Machines, of which the following is a specification.

My invention relates to certain new and useful improvements in machines designed to cut a bar or bars of clay into uniform thicknesses or lengths as they issue from the die of a brick or tile machine, and the particular class of machines herein illustrated is of the rotary automatic type where the reel which carries the cutting-wires has a variable continuous motion, as distinguished from those machines wherein the reel comes to rest after the cutting-wires pass through the bar of clay.

My invention consists of the novel parts and the construction, arrangements, and combinations of parts, which I will hereinafter fully describe and claim.

Figure 6:
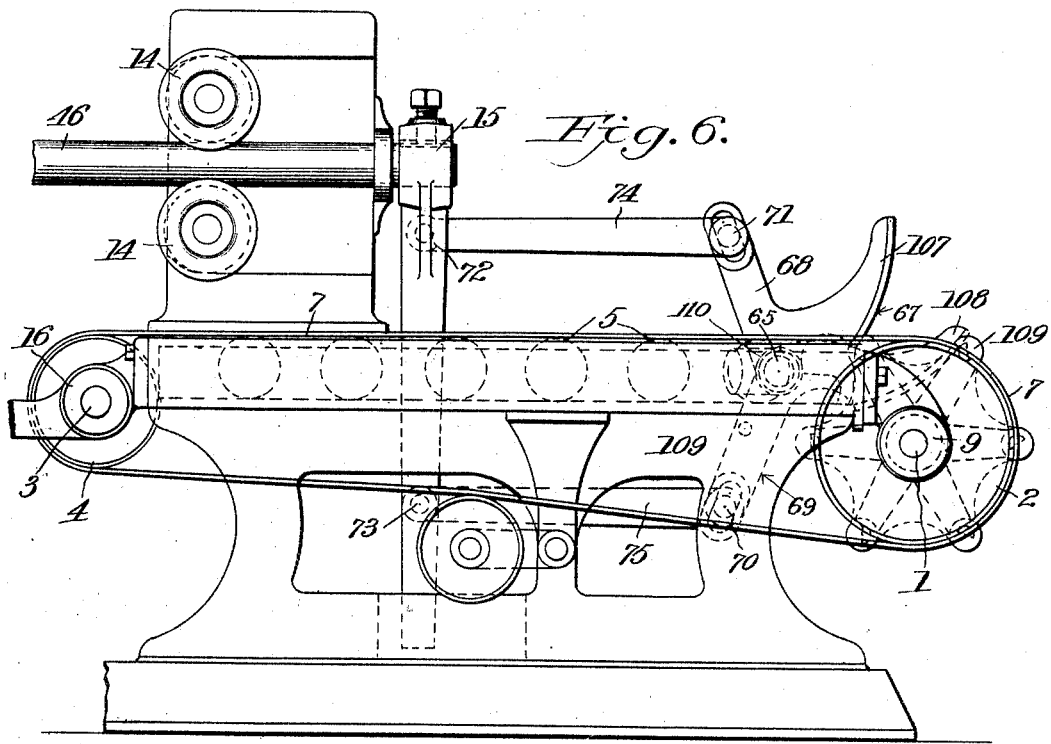
Figure 7:
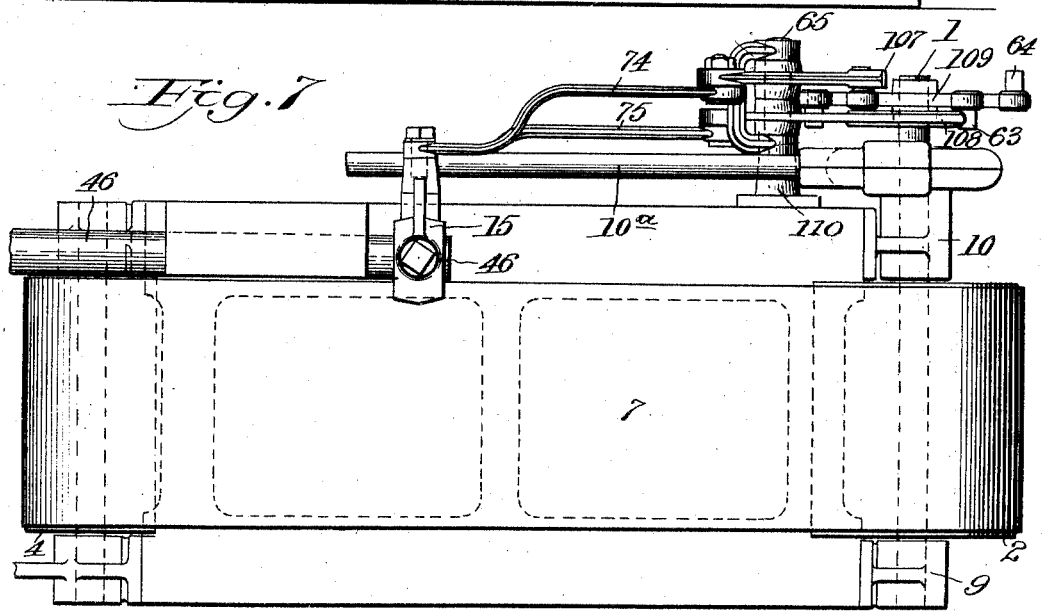

In the accompanying drawings, forming part of my specification, and in which similar reference characters indicate like parts throughout the several views, Figure 1 represents the side elevation with a portion of the reel, gear, and track cut away and the separating-table broken off. Fig. 2 is the plan view of Fig. 1. Fig. 3 is the end elevation. Fig. 4 is a partial top view and partial sectional view of the governing and driving mechanism for controlling the wires. Fig. 5 is a sectional end view of Fig. 4. Fig. 6 is a side elevation of the measuring-table, showing the cam movement that reciprocates the carriage. Fig. 7 is a top view of same. Fig. 8 is a sectional view of the friction-driver. Fig. 9 is a side view of same. Fig. 10 is a sectional view of the governor through lines A A of Fig. 11. Fig. 11 is a sectional view of Fig. 10 through center line B B of Fig. 10. Figs. 12 and 13 are side and sectional views of the adjustable measuring-pulley.

It is a fact now recognized by those skilled in the manufacture and use of brick and tile cutting machines employing cutting appliances and means for feeding a bar or column of clay thereto to be severed into uniform thicknesses and lengths that it is necessary for obtaining the best results to vary the diameter of the measuring-drum to suit the amount of clay that is to be severed into the several different thicknesses and lengths.

A measuring-drum answering the requirements of the machine noted is illustrated in Figs. 12 and 13 and will be fully described hereinafter, although it is not specially claimed herein, as it forms the subject-matter of the claims of another application filed by me of even date herewith.

Referring to Figs. 1, 2, and 3, which show the organized machine, it will be seen that the machine comprises three essential divisions or sections—namely, the measuring-table section A, the carriage and cutting section B, and the separating or off-bearing table section C. These three sections or divisions of the machine, except that portion of the section C which omits the portion of the off-bearing table which is not shown, are suitably secured and mounted on a base-plate $a$, to which is also appropriately bolted or otherwise secured a frame casting or pedestal $b$, which forms the support for the measuring-table proper. To one end of this table T is bolted antifriction journal-bearings 9 10, in which is mounted to rotate the shaft 1 of the measuring-drum 2, and on the opposite end of the table T are bolted or secured the antifriction pin journal-bearings 16, which carry a shaft 3, on which is mounted a drum 4. In the sides of the table between the drums 2 and 4 are mounted a number of rollers 5, each of which is provided with gudgeons 6, adapted to rotate in bearings which are formed in the table, said drums and rollers forming a suitable support for the measuring-belt 7, which receives the bar or column of clay from the usual forming-die (not shown) of the brick-machine and advances said bar in measured quantities to the cutting-section B of the machine. During the passage of the bar of clay to the cutting-section it is caused to pass in contact with suitable means for applying a lubricant to its outer sides. The lubricating means are shown generally at L, and they include an oil-chamber $d$, in which rollers $e$ are mounted and over which the bar of clay passes. Vertical rollers $f$ are also employed to lubricate the sides of the bar of clay, and in conjunction with said rollers $e f$ I employ an oil-reservoir and an appropriate system of valve-controlled oil-distributing pipes. This lubricating means need not be more specifically described, as it forms no essential part of the present invention, and it is described and shown in detail in a former application, Serial No. 182,302, filed by me November 23, 1903.

On the shaft 1 of the measuring-drum 2 is fixed a spiral gear-wheel 8, which is in mesh with and drives a spiral pinion $9^a$ on the shaft $10^a$, mounted in journal-bearings $20'\ 20'$, and which shaft I will hereinafter designate as the "governor-shaft," as it carries that portion 101 of the governor which is fixed to said shaft, as shown in the enlarged detail, Figs. 4 and 11.

Another part of the governor—namely, the part marked 102, Fig. 4—is mounted to run loose on the shaft, and suitably attached to the hub of said loose part 102 is the driving-sleeve 100. Both parts 101 and 102 are in the form of flanges separated from each other and rigid with sleeves or hubs which abut endwise, as shown in Figs. 4 and 11.

By referring to Figs. 10 and 11 it will be seen that the part 101 of the governor, which is fixed to the shaft $10^a$, has a hub 11 with a flange 12 and cam-like projections 13, there being three of the latter shown, and the loose part 102 of the governor has a hub 14 with a flange 15, in which are riveted or otherwise secured three studs 16, each of which carries a friction-shoe having a curved or cam-shaped member or arm 17, as shown in Fig. 10, said shoes being loosely mounted at one end upon said studs and being designed to be engaged by said cams 13, as will be hereinafter described. Surrounding the friction-shoes, which are spaced an equal distance apart and occupying the space between the flanges 12 15, respectively, and having its edges fitting recesses in said flanges, as shown at 18, is a loose annulus or ring 103.

The hub or sleeve 102 is held in position on the shaft $10^a$ by means of a collar or head 20, and on this hub or sleeve is mounted and held in position by a set-screw the driver 100, having a quadrilateral hole which extends toward the cutting-carriage and is designed to receive the end of the shaft 21, which is provided with rollers 22, Figs. 2 to 4, said shaft 21 being driven by pinion 34. It will be noted that the length of the hole in the driver is sufficient to permit the said carriage to travel backward and forward in the line of travel of the bar of clay while performing its work. The pinion 34, through the shaft 21, rollers 22, and driver 100, revolves the sleeve 102 and the flange 15, which carries the friction-shoes 17, while the measuring-belt, which is driven by the bar of clay, drives the spiral gear 8, pinion $9^a$, and shaft $10^a$ and the part 101 of the governor, which is fixed thereto.

To the base-plate $a$ are bolted journal-bearing $22^a$ and 43, which support the main driving-shaft 23, on which are mounted the fast and loose driving-pulleys 24 25, and to said shaft 23 is keyed the hub of a plate friction-wheel 97, on either side of which are placed friction-surfaces 26 27, as shown in Fig. 8. The loose portion of the friction-driver is represented at 96 as opposing the fixed part 97, and said loose part has a long sleeve 95, which is mounted loose on the shaft 23. Attached to the loose member 96 of the friction-driver by means of studs 30 is a friction disk or plate 98, the inner face of which is designed to bear against the friction-surface 26 of the fixed part of the driver, while the inner face of the loose member 96 of the driver is adapted and designed to engage the friction-surface 27, the said friction-plate 98 being held at proper tension against the companion friction-surface on the friction-wheel 97 by means of springs 29, which are mounted on studs 30 and held in position by washer 31 and nut 32. (Shown particularly in Figs. 4 and 8.)

In Figs. 2 to 5, inclusive, it will be noted that I provide the machine with a brake attachment, which in the present instance is shown as of the strap or band type. This brake-band $B^\times$ is operated by a bell-crank 189, which is mounted on a shaft $s$, Fig. 2, supported by a hanger 99, bolted to the base-plate $a$.

The bell-crank 189 is provided with a weight-lever 35, on which is mounted a weight 36, having an eyebolt 37, to which is attached a flexible band 38, which passes around and is attached to a governing-ring 103.

On the opposite end of the sleeve 95 from the loose part 96 of the friction-driver is mounted a driving-pinion 93, which meshes with a long intermediate horizontal pinion 91, mounted on the shaft 39, supported in bearings 44', bolted to the base-plate $a$.

The rim or wheel 33 of the reel has its outer periphery provided with a gear $r$, which engages with the long pinion 91 and is revolved thereby, and on the inner periphery of the said annular rim or flange is an internal gear 40, which meshes with the gear-wheel 34 on the shaft 21.

On the annular rim or wheel 33 are bolted studs 41, carrying a series of rollers 35, each having a beveled flange at one end to hold the ring or head in proper position while it revolves to carry the cutting-wires through the bar of clay.

A wheel $32^a$ has a hub 45, which is keyed to the shaft 46, said shaft being prevented from rotating by an arm 15, keyed to the forward end, and said wheel having its periphery formed as a trackway 42, Fig. 1, one edge of which is beveled to correspond with the beveled flange on the rollers 35. The opposite edge of the trackway 42 forms a guide for the annular rim or wheel 33 at 44. The lower end of the curved arm 15, before mentioned, is adapted to reciprocate in guides 47, Fig. 3, which form a part of the base-plate $a$.

The shaft 46 is supported and is allowed to reciprocate on antifriction-rollers 14, which are provided with circular faces to correspond with the diameter of the shaft, and the said rollers 14 are mounted on pins 48, which are mounted in hangers 119 120, the former being bolted to the top of the table T and the hanger 120 being bolted to the top of the pedestal 40. The upper portion of the hangers 119 120 are arranged with circular guides 49 50, through which slides the shaft 46 and which retain said shaft parallel with the center line of the machine, said shaft forming, essentially, the support for the carriage of the cutting portion of the machine, this being a distinct feature of my machine and a departure from the usual manner of providing means for mounting a reciprocating carriage. The shaft 46 is provided with collars 27, and rubber rings 51 form bumpers when coming in contact with the guides 49 50 to relieve the carriage from excessive jar when at the end of each stroke. On the aforesaid shaft 46 I also secure by set-screws 53 a series of push-boards 52, the width of which is made to correspond with the thickness or length of the ware to be cut. The push-boards are provided with necessary supports or platens 54 and are bolted to the push-boards.

To the inner periphery of the rim or wheel 33 are bolted arms 30$^\times$, on which are mounted spring-wire attachments 89 90, which with the push-boards and platens before noted may be similar to corresponding parts shown, described, and claimed more in detail in my aforesaid former application Serial No. 182,302, the attachments 89 90 in the present case differing from the former ones only in that the latter are mounted on round rods, while in the present case they are mounted on rectangular bars.

The driving-shaft 23 is provided with a sprocket-wheel 56, which through the medium of a sprocket-chain 57 drives a sprocket-wheel 58 on the shaft 59, supported in suitable hangers, which may constitute a part of the hanger 40'. On the shaft 59 is mounted a bevel-pinion 42, which meshes with and drives a corresponding bevel-pinion 42', mounted on the end of the shaft 60, Fig. 2, said shaft being supported at one end in a bearing which forms a part of the hanger 40', and having its opposite end mounted in a bearing which forms a part of the hanger 41, said hanger being bolted to the pedestal 40.

Mounted transversely across the pedestal 40 is the shaft 60, having a drum or pulley 61, which drives the separating or off-bearing belt 62, which conveys the separated or cut lengths of bricks or tiles from the cutting-section of the machine.

Referring now particularly to the enlarged detail, Figs. 6 and 7, it will be seen that the shaft 1 of the measuring-drum 2 has mounted upon it a tappet-wheel 109 with two sets of oppositely-extending alternately-operating tappets, (designated as 63 and 64,) and to the side of the table-frame is bolted a hanger 110, in which is journaled a shaft 65, on which are mounted the cam-rockers 107 and 108, the cam portion of each of which is preferably disposed above the center line of the shaft 1, while the upwardly-extending arm 68 or other member of said cam-rocker 107 is above the center and the downwardly-extending arm 69 of the other rocker, 108, is below the center line of said shaft 1. The cam-faces of the rockers are given such curvature as to insure the proper reciprocation of the cutting-carriage in unison with the travel of the bar of clay as the tappet-wheel, with its tappets 63 64, revolves in a circular path. To insure the tappets freeing themselves from the rockers 107 108 at the proper moment, the said tappets are preferably cut away at one side, as shown in Fig. 6, and the tappets and rockers are so related to each other that the rocker 107 has its cam-face 67 alternately engaged by the tappets 64, and the cam-face of the rocker 108 is alternately engaged by the other tappets, 63, which alternate with the tappets 64.

The extending-arms 68 and 69 of the rockers 107 and 108, respectively, are provided with holes in which wrist-pins 70 and 71 operate, said holes being elongated to regulate the travel of the carriage in section B of the machine.

On the end of the reciprocating shaft 46 is fixed the vertical arm 15, having the wrist-pins 72 and 73, to which the upper and lower adjustable rods 74 and 75 are attached to furnish the connection between the arm and the oppositely-extending arms of the rockers 107 and 108, whereby the latter alternately actuate the reciprocating shaft 46 through the medium of the arm 15 and its connections.

The hanger 110 also furnishes an outer bearing for the measuring-drum shaft 1. On the end of the shaft 46 opposite to the arm 15 is a second arm 47, through the outer end of which passes the adjustable end of a hanger, which supports the outer end of the apron 77, said apron being attached to the final platen at 78 and forming a bridge over which the severed parts pass from the platens 54 to the off-bearing belt after they are cut from the bar of clay. A similar apron or bridge 78 at the opposite end of the section B supports the bar of clay when it passes from the lubricating devices to the platens.

The measuring-drum before alluded to is shown in Figs. 12 and 13, and its construction includes the following: To the drum-shaft 1 is keyed a hub 117, which is rigid with a flange 80, provided with curved slots 81, which are concentric with the shaft.

On the face of the flange 80 are provided the radial guideways 82, and from the periphery of the flange 80 projects a lug 83, the purpose of which I will presently explain. The guideways 82 slidably receive the flanges 84, which are rigid with the segments which constitute the periphery of the drum, said flanges 84 being held in position by means of bolts 85, which pass through elongated holes in the flanges, whereby the latter and their segments may be adjusted toward and from the shaft 1 to increase or decrease the diameter of the drum.

A hub 92 is loosely mounted on the shaft 1 and is rigid with a flange 118, which fits flatwise against the flange 80, and riveted to said flange 118 are the pins 87, which project through the curved slots 81 of the flange 80 of the hub 117 and are designed to bear against the inner inclined ends 88 of the flanges 84 of the segmental sections of the drum.

On the outer periphery of the loose flange 118 is a projection 89, which registers with the lug 83 on the fixed flange 80, and through which projection 89 passes the adjusting-screw 90, which is provided with a lock-nut. This arrangement affords means of adjusting the segmental rim of the drum either in or out at will by loosening the bolts 85 and screwing up or unscrewing the screw 90, thereby turning the loose flange 118 axially about the shaft to cause the bolts 87 to ride along the inclined or cam ends of the flanges 84.

After the pulley is adjusted to the proper or desired size the segmental rim thereof is bolted firmly in its adjustment by means of the bolts 85 and the adjustable screw 90 is locked by the nut 91.

The operation of the machine as hereinbefore described may be generally stated as follows: As the bar of clay, which has been thoroughly mixed and tempered in the manner well known in the art, issues from the customary die (not shown) of the brick-machine it is received on the measuring-belt 7 and drives the same. This revolves the shaft 1, on which is mounted the spiral gear 8, which drives the pinion $9^a$ and causes the shaft 10 to revolve in its bearings. The shaft 10 carries with it the part 101 of the governing mechanism, which disengages the friction-shoes 104 from the friction-ring 103, thereby permitting the weight 36 to disengage the brake-band and allowing the friction-driver 86 and sleeve 95 to revolve. This action communicates motion to pinions 93 and 91, which in turn rotate the rim or wheel 33 to drive pinion 34 and shaft 21, on the end of which are the rollers 22, which drive that portion of the governor 100. Whenever the ring or head 33 is driven faster than necessary, it engages the friction-shoes 104 with the projections 13 on the member 101 of the governor and engages the ring 103, which is thereby revolved and draws upon the brake-band and lifts the weight 36, thus tightening the brake-band and causing the ring or head 33 to revolve in unison with the travel of the bar of clay. The parts are so designed and timed that the measuring-drum measures out sufficient clay to cut the required number of brick at each half-revolution of the rim or wheel 33.

If the bar of clay should increase its speed, it releases the friction-shoe in the governor, which permits the weight 36 to slacken the brake-band and the friction-driver to increase the speed of the rim or wheel 33, which has a tendency to run faster than it should, thereby bringing the friction-shoes of the governor in contact with the projections on the other member of the governor and tightening the friction-ring. This lifts the weight 36 and again tightens the brake-band, causing the friction-driver to slip and holding the rim or wheel 33 in proper register with the movement of the bar of clay.

As the bar of clay moves in the direction of the arrow, Fig. 2, it revolves the tappet-wheel 109 and this operates the cam-rockers 107 and 108, by the tappets 64 and 63 coming in contact alternately with the curved or cam faces thereof. The movement of the rockers causes a reciprocal movement to be given the carriage (section B) through the arms 68 and 69 and rods 74 and 75, the pivoted arm 15 and sliding shaft 46, the latter sliding on the rollers 14. The sliding shaft 46 carries with it the rim or wheel 33, the wheel $32^a$, and the bars or studs $30^\times$, on which the wire attachments are mounted, and also the supports 54 and push-boards 52 with the wire rings 61. The arm 15, being keyed to the end of the sliding shaft 46 and extending down into a slot or channel in the base-plate $a$, serves to prevent said shaft and the trackway 32 and also the said supporting-plates and push-boards from revolving. At the same time the rim or wheel 33, carrying the wire attachments, is permitted to revolve to carry the wires through the spaces between the supports 54 and push-boards 52, thereby severing the bar of clay into the desired thickness or length.

While the wires are performing their work, the cam-rockers reciprocate the shaft 46 with the aforesaid attachments in register with the travel of the bar of clay, cutting the parts of uniform thickness or length at right angles with the face of the moving bar of clay.

When the parts are severed from the bar of clay, they are pushed by the latter over the apron 77 onto the separating or off-bearing belt 62, whence they are conveyed any desired distance to be removed by an operator and placed on cars or other conveyers and removed to a drier.

The main power-shaft 23, with its fast and loose pulleys 24 and 25, is speeded high enough to always drive the rim or wheel 33 at sufficient speed through the train of gears before mentioned to sever the bar of clay as it increases or decreases its speed as it issues from the die of the brick-machine.

If from any cause the belt 7 should slip on the measuring-drum, the weight 57 is slipped toward the end of the rod on which said weight is mounted, and this causes a belt-tightener pulley 6 to press all the harder against the bottom of the belt, Fig. 1.

The shaft 23 has a fixed speed previously determined in the well-known manner, which drives the off-bearing belt 62 at a fixed speed through the pulley 25, shaft 95, gears 42, and sprocket-wheels 56 58, and chain 57.

While the machines of this type are not broadly new, the salient parts of the foregoing constructions, to which I wish to draw particular attention, include the following:

First. The shaft 46, with its roller-support 14 and carrying the stationary-wheel 32$^a$ and revolving head or wheel 33 and wire attachments, also the supporting-plates 52 and 54 and rings 61, said shaft being held in position by an arm 15, which prevents the shaft 46 with its parts from revolving, while the rim or wheel 33 and its attachments revolve on wheel 32$^a$. This is a decided change in the way of mounting carriages for the cutting appliances of machines of the character shown and described.

Second. A second feature of improvement is the governing device extending from the spiral gear 8 on the measuring-drum shaft through to the pinion 34, mounted on the shaft 21 and revolved by the rim or wheel 33. By the governing device shown and described I am enabled to obtain a variable continuous revolving motion of the rim or wheel 33 and its adjuncts, while the shaft 46 with its parts are reciprocated in proper time with the travel of the bar of clay, cutting the latter at proper intervals. The speed of the wire-cutting attachments is regulated by the governor, which causes the friction-driver to slip through the brake-band the weight and friction-pin of the governor.

Third. A further improvement in this class of machines is the tappet-wheel and cam-rockers adapted to give the carriage of the cutting-section a reciprocating motion by the revolving motion of the tappet-wheel on the measuring-drum shaft, which causes the carriage to travel in register with the moving bar of clay while the cutting-wires are passing through the bar, severing the same into lengths.

Fourth. Another important improvement is in the adjustable measuring-drum, which, however, is not claimed herein, as its subject-matter forms the basis for a separate application filed of even date herewith.

Having thus described my invention, what I claim as new, and desire to secure by Letters Patent, is—

1. In a brick and tile cutting machine, the combination with a supporting-framework, a measuring-drum mounted thereon and a measuring-belt upon which the bar of clay is received, of a longitudinally-reciprocal member, a roller-support therefor, means for imparting reciprocal movement to the member said means including oppositely-operating rockers mounted on a common axis, and means connecting said rockers with the member, independent tappets mounted on a common axis and alternately engaging the rockers to impart positive reciprocal movements to the member in both directions, complementary cutting appliances carried by the member, and means for rotating the cutting appliances relative to the member.

2. In a brick and tile cutting machine, the combination with a supporting-framework the measuring-drum and the belt upon which the bar of clay is received, of a longitudinally-slidable member and a guiding support therefor, an arm on the member and guided on the framework whereby the member is held against axial movement but permitted to slide longitudinally, oppositely-arranged rocking members and independent connections therefrom to said arm, and series of tappets operated by and in unison with the drum and successively engaging alternate rockers whereby alternate reciprocal movements are imparted to the slidable member, cutting appliances carried by said member and means for rotating said appliances relative to the member.

3. In a brick and tile cutting machine the combination with a supporting-framework, the measuring-drum and the belt upon which the bar of clay is received, of a longitudinally-slidable non-rotatable shaft, a roller-support therefor, cutting appliances and clay-supporting means carried by the shaft, means for actuating the cutting devices, alternately-operating tappets revoluble about a single axis, and rockers operable about a single axis and each having a cam-face disposed in the range of action of one of said tappets said tappets having oppositely-extending members, and means connecting said members with the slidable shaft whereby the shaft and the cutting appliances carried thereby are given alternate reciprocal movements.

4. In a brick and tile cutting machine, the combination with a supporting-framework, a drum thereon and a measuring-belt upon which the bar of clay is received, of a longitudinally-reciprocable shaft, series of alternately-acting tappets revoluble about the axis of the drum, a pair of rockers having curved faces one disposed in the range of action of each series of tappets said rockers having arms extending in opposite directions, means connecting said arms with the reciprocal shaft, supporting-platens and push-boards carried by the shaft, a wheel fixed to the shaft and a rim or wheel guided on the first-named wheel and rotatable relative thereto, means for rotating the rim or wheel relative to the shaft, and cutting appliances carried by said rim or wheel.

5. In a brick and tile cutting machine, the combination with clay-feeding means at one end of the machine and an off-bearing mechanism at the opposite end of the machine, said feeding means including a measuring-drum and shaft and a belt, of a reciprocating carriage mechanism intermediate of the ends of the machine and including a longitudinally-guided shaft, an arm fixed to the guided shaft for holding said shaft against rotation, driving connections between the drum-shaft and said arm, whereby the continuous travel of the belt in one direction effects the reciprocal movement of the guided shaft in both directions, a wheel fixed to the shaft, a rim or wheel guided on and carried by the first-named wheel, clay-supporting means suspended from the guided shaft, means for rotating the guided rim or wheel relative to the companion fixed wheel, and cutting appliances carried by the rim or wheel.

6. In a brick and tile cutting machine, the combination with a measuring-drum and shaft and a clay-receiving belt at one end of the machine and an off-bearing mechanism at the opposite end of the machine, of an intermediate reciprocating carriage mechanism including a longitudinally-guided shaft, an arm fixed thereto and engaging with a fixed part of the machine whereby the shaft is held against rotation, a wheel fixed to the shaft and provided with an annular track, a second wheel or rim and means carried thereby and engaging the track of the first-named wheel whereby the wheels are held together and one is rotatable relative to the other, cutting appliances carried by the rotatable wheel or rim, driving connections between the drum-shaft and said arm, for reciprocating the shaft, and means for rotating the second wheel or rim.

7. In a brick and tile cutting machine the combination with a measuring-table mechanism including a measuring-drum and shaft and a clay-receiving belt, of a reciprocating carriage mechanism including a reciprocating shaft and rotatable and non-rotatable members carried thereby said rotatable member provided with cutting appliances, means for operating the rotatable member, an arm on the shaft and engaging a fixed part of the machine whereby said shaft is held against axial movement during the operation of the rotatable member and the cutting appliances, and clay-supporting devices carried by the shaft, and driving connections between the drum-shaft and said arm, for reciprocating said shaft.

8. In a brick and tile cutting machine the combination with a clay-measuring table mechanism, including a measuring-drum and shaft and a clay-receiving belt, and a reciprocating carriage mechanism including complementary cutting appliances and clay-supporting means, of roller-supports at opposite ends of the carriage mechanism, a longitudinal shaft guided on said supports, and carrying the cutting and clay-supporting means, an arm on the longitudinal shaft engaging a fixed part of the machine to hold the shaft against rotation, driving connections between the drum-shaft and said arm, for positively reciprocating the longitudinal shaft, and means for operating the cutting devices relative to the clay-supporting means.

9. In a brick and tile cutting machine, the combination with a clay-measuring table mechanism and a revoluble cutting mechanism, of governing means between said cutting mechanism and the measuring mechanism said governing means including a shaft driven by the measuring devices, a shaft alined with the first-named shaft and driven by the cutting mechanism, engaging members carried by adjacent ends of said shafts and an annulus driven by the engagement of said members, a driving-shaft provided with a friction-driver, a connection between the annulus and the friction-driver, and a brake controlling the said driver through the connection from the annulus.

10. In a brick and tile cutting machine the combination with a measuring-drum and a shaft therefor, and complementary cutting mechanism including a revoluble rim or wheel provided with gear-teeth, of a longitudinal shaft and gearing between the same and the drum-shaft, a shaft arranged in line with the longitudinal shaft, a governor between the adjacent ends of the alined shafts and including pivoted friction-shoes on one of said shafts and cam-like projections on the other of said shafts and adapted to actuate said shoes, a ring loosely inclosing said shoes, a power-shaft parallel with the alined shafts and provided with a driver, which includes a part fixed to the shaft and a part loose thereon, transmitting-gears between said loose part and the said rim or wheel, and a brake associated with the driver and controlled by the governor.

11. In a brick and tile cutting machine the combination with a measuring-drum and the shaft thereof, a power-shaft and a driver thereon and including a part fixed to the shaft and a companion part loose on the shaft and provided with a gear-wheel, means for holding the parts of the driver in frictional contact, a governor-shaft and operating means between the same and the measuring-drum, a reciprocating carriage having complementary cutting appliances and a rotatable rim or wheel, a shaft carried by the carriage and alined with the governor-shaft, transmitting-gears between the last-named shaft and the first-named gear, friction-shoes carried by the said last-named shaft and projections carried by the other of the alined shafts and adapted to be engaged by said shoes when the speed of the cutting devices is exceeded by the travel of the bar of clay, a band inclosing the shoes and engaged thereby when the shoes operatively engage the projections, and a brake controlling the friction-driver on the power-shaft and controlled by the said band to regulate the speed of the cutting appliances relative to speed of the bar of clay.

12. In a brick and tile cutting machine, the combination with a measuring-drum, a power-shaft provided with a driver which includes a part fixed to the shaft and a part loose thereon, a reciprocating carriage and complementary cutting appliances carried thereby said carriage including a revoluble rim or wheel power connections between the driver and said rim or wheel and means for governing the speed of the cutting appliances relative to the travel of the bar of clay said governing means including two alined shafts one of which is provided with pivotally-mounted, curved, friction-shoes and the other is provided with cam-like projections, gearing between the said rim or wheel of the carriage and one of the alined shafts whereby the latter is rotated by the former to engage the friction-shoes with the projections when the speed of the rim or wheel is greater than the travel of the bar of clay, gearing between the measuring-drum and the other of the alined shafts whereby the speed of the latter is regulated by the travel of the bar of clay, a loose band surrounding the shoes and rotated by contact therewith when the shoes are expanded by the projections, a brake controlling the friction-driver on the main power-shaft and a connection between this brake and the loose band of the governor whereby the latter actuates the brake to regulate the speed of the cutting mechanism relative to the travel of the bar of clay.

13. In a brick and tile cutting machine, the combination with a reciprocating carriage provided with a rotatable rim or wheel carrying complementary cutting appliances, a power-shaft provided with a two-part friction-driver and gearing between the same and the said rim or wheel, of means for governing the speed of the rim or wheel relative to the travel of the bar of clay said means including two alined independently-rotatable shafts one carried by and operated from, the carriage and the other operated by the travel of the bar of clay, one of said alined shafts having a fixed member provided with projections and the other member having pivotally-mounted curved shoes to be brought into engagement with said projections when the shafts are rotated at variable speeds, a loose band surrounding the shoes and engaged thereby when the shoes engage said projections, a brake controlling the friction-driver on the main shaft, and connections between said loose band and the brake whereby the latter automatically controls the driver to vary the speed of the cutting devices relative to the speed of the bar of clay.

14. In a brick and tile cutting machine the combination with a reciprocating carriage having complementary cutting mechanism, and an internally and externally toothed rim or wheel, a measuring-drum and belt, a power-shaft provided with a two-part friction-driver with one part fixed to the shaft and the other having a sleeve loose on the shaft and provided with a gear-wheel, and connections between said gear-wheel and the outer toothed portion of the rim or wheel, of a shaft carried by the carriage and provided with a gear to engage the interior toothed portion thereof, a driving member 100 having a recess to receive the end of the last-named shaft said shaft having rollers to travel in said member, a flange fixed to the driver and curved friction-shoes pivotally mounted on the flange, a shaft actuated by the measuring-drum and alined with the reciprocating shaft, and having a fixed hub and flange said hub provided with curved projections 13 located interior to the shoes, a loose ring mounted between said flanges, a brake controlling the friction-driver on the power-shaft, a counterbalance between said loose ring and the said brake whereby the brake is automatically under the control of the loose ring and the speed of the cutting devices is regulated according to the travel of the bar of clay.

15. In a brick and tile cutting machine the combination with a reciprocable carriage and complementary cutting appliances carried thereby, and a measuring-table mechanism of means for reciprocating the carriage in unison with the travel of the bar of clay said means including a longitudinally-reciprocable shaft fixed to the carriage, an arm on the shaft extending at right angles thereto, cam-rockers having arms extending in opposite directions, connections between said arms and the arm on the shaft and tappets rotatable about a single axis and adapted to alternately engage said cam-rockers.

16. In a brick and tile cutting machine the combination with a reciprocable carriage and complementary cutting appliances carried thereby, and a measuring-table mechanism of a longitudinally-reciprocable shaft fixed to the carriage, a depending arm on the shaft, rockers mounted on the same axis and each including a cam-face and an extending arm said arms so arranged that the arm of one rocker extends above and the arm of the other rocker extends below the axis of the rockers, connection between said arms and the arm on the shaft, and a double series of tappets rotatable about a single axis and alternately arranged whereby the rockers are alternately operated to reciprocate said carriage.

17. In a brick and tile cutting machine the combination with a reciprocable carriage and complementary cutting appliances carried thereby, a measuring-drum and a shaft therefor, of a reciprocable shaft fixed to and supporting the carriage, roller-guides for the shaft, an arm fixed to the shaft, a pair of rockers mounted on the same axis and consisting of cam-faces and oppositely-extending arms, adjustable rods connecting the arms with the arm on the shaft, and a tappet-wheel on the shaft of the measuring-drum having tappets extending alternately in opposite directions and adapted to alternately engage the cam-faces of the rockers, whereby the shaft and its attached carriage are reciprocated to cause the carriage to travel in register with the moving bar of clay while the cutting devices are passing through the bar and severing it into sections.

In testimony whereof I have hereunto set my hand in presence of two subscribing witnesses.

WILLIAM R. CUNNINGHAM.

Witnesses:
   J. L. DELASHMUTT,
   P. O. PERROTT.